(12) United States Patent
Kneifl et al.

(10) Patent No.: US 8,308,218 B2
(45) Date of Patent: Nov. 13, 2012

(54) BI-FOLD POPUP SOFT TONNEAU COVER

(75) Inventors: Kelly Kneifl, Yankton, SD (US);
Michael R. Spencer, Hubbard, NE (US)

(73) Assignee: Truxedo Inc., Yankton, SD (US)

( * ) Notice: Subject to any disclaimer, the term of this patent is extended or adjusted under 35 U.S.C. 154(b) by 303 days.

(21) Appl. No.: 12/636,419

(22) Filed: Dec. 11, 2009

(65) Prior Publication Data

US 2010/0148534 A1    Jun. 17, 2010

Related U.S. Application Data

(60) Provisional application No. 61/121,599, filed on Dec. 11, 2008.

(51) Int. Cl.
*B60P 7/02* (2006.01)
(52) U.S. Cl. .............. 296/100.11; 296/100.14
(58) Field of Classification Search ............. 296/100.03, 296/114, 100.11, 100.12, 136.12, 136.13, 296/136.01, 107.09, 183, 100.13, 100.14, 296/100.15, 100.16, 100.17, 100.18; 135/129
See application file for complete search history.

(56) References Cited

U.S. PATENT DOCUMENTS

| | | | |
|---|---|---|---|
| 963,098 A * | 7/1910 | Waters | 296/114 |
| 1,827,059 A * | 10/1931 | Woolcott | 296/105 |
| 1,888,121 A * | 11/1932 | Graham | 296/116 |
| 2,832,362 A * | 4/1958 | Critoph | 135/129 |
| 3,479,079 A * | 11/1969 | Coursault | 296/26.06 |
| 3,773,379 A * | 11/1973 | Loiseau | 296/107.09 |
| 4,168,096 A * | 9/1979 | Langston | 296/100.14 |
| 4,265,479 A * | 5/1981 | Langston | 296/100.14 |
| 4,964,669 A * | 10/1990 | Geier | 296/108 |
| 5,139,375 A * | 8/1992 | Franchuk | 410/105 |
| 5,238,288 A * | 8/1993 | Chandler | 296/100.18 |
| 5,366,266 A * | 11/1994 | Harbison | 296/100.02 |
| 5,443,295 A * | 8/1995 | Moberly | 296/105 |
| 5,839,462 A * | 11/1998 | Randall | 135/128 |
| 6,053,557 A * | 4/2000 | Kooiker | 296/100.06 |
| 6,499,791 B2 * | 12/2002 | Wheatley | 296/100.16 |
| 6,669,264 B1 * | 12/2003 | Tucker | 296/100.15 |
| 6,715,817 B2 * | 4/2004 | Nolan et al. | 296/100.12 |
| 6,948,761 B2 * | 9/2005 | Haack et al. | 296/100.18 |
| 7,008,000 B1 * | 3/2006 | Schmeichel | 296/100.16 |
| 7,481,478 B2 * | 1/2009 | Cho et al. | 296/37.16 |
| 7,510,230 B2 * | 3/2009 | Chenowth | 296/100.16 |
| 7,523,976 B1 * | 4/2009 | Severson | 296/107.01 |
| 2010/0109373 A1 * | 5/2010 | Pivetta | 296/100.11 |

* cited by examiner

*Primary Examiner* — Glenn Dayoan
*Assistant Examiner* — Pinel Romain
(74) *Attorney, Agent, or Firm* — Harness, Dickey & Pierce, P.L.C.

(57) ABSTRACT

A tonneau cover system for use in conjunction with a storage bed having an upwardly directed opening. The tonneau cover system includes a frame portion and a cover portion. The frame portion includes a first mounting track, a second mounting track, a first frame member, a second frame member a first hinge mechanism and a second hinge mechanism. The first frame member has a first end and a second end. The second frame member has a first end and a second end. The first hinge mechanism operably attaches the first ends of the first frame member and the second frame member to the first mounting track. The second hinge mechanism operably attaches the second ends of the first frame member and the second frame member to the second mounting track. The cover portion extends over the frame portion.

16 Claims, 5 Drawing Sheets

BI-FOLD POPUP SOFT TONNEAU COVER

REFERENCE TO RELATED APPLICATION

This application claims priority to U.S. Provisional Application No. 61/121,599, which was filed on Dec. 11, 2008, the contents of which are incorporated herein by reference.

FIELD OF THE INVENTION

The invention generally relates to covers for vehicles. More particularly, the invention relates to a soft tonneau cover of a vehicle having an open top storage area.

BACKGROUND OF THE INVENTION

One class of vehicles that has gained popularity is utility terrain vehicles because while similar to all-terrain vehicles, the utility terrain vehicles also generally include a storage region. One benefit of the storage region is that the storage region enables objects to be more easily transported than with all-terrain vehicles. An example of one such utility terrain vehicle is the Polaris RZR.

In certain configurations, the storage region may include a floor, sides walls, a front wall and a back wall that together form a partially enclosed region that may be similar in shape to the bed on a pickup.

SUMMARY OF THE INVENTION

An embodiment of the invention is directed to a tonneau cover for a storage region on a utility terrain vehicle. The tonneau cover is movable between an open configuration and a closed configuration. When in the open configuration, objects may be placed into or removed from the storage region through the upwardly directed opening. The open configuration also enables tall objects to be stored in the storage region. When in the closed configuration, the tonneau cover substantially covers the storage region to protect objects placed therein such as from falling out of the storage region or from exposure to environmental elements such as rain and snow. Objects may be placed into or removed from the storage region when the tonneau cover is in the closed configuration by opening a portion of the storage region such as a back wall.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
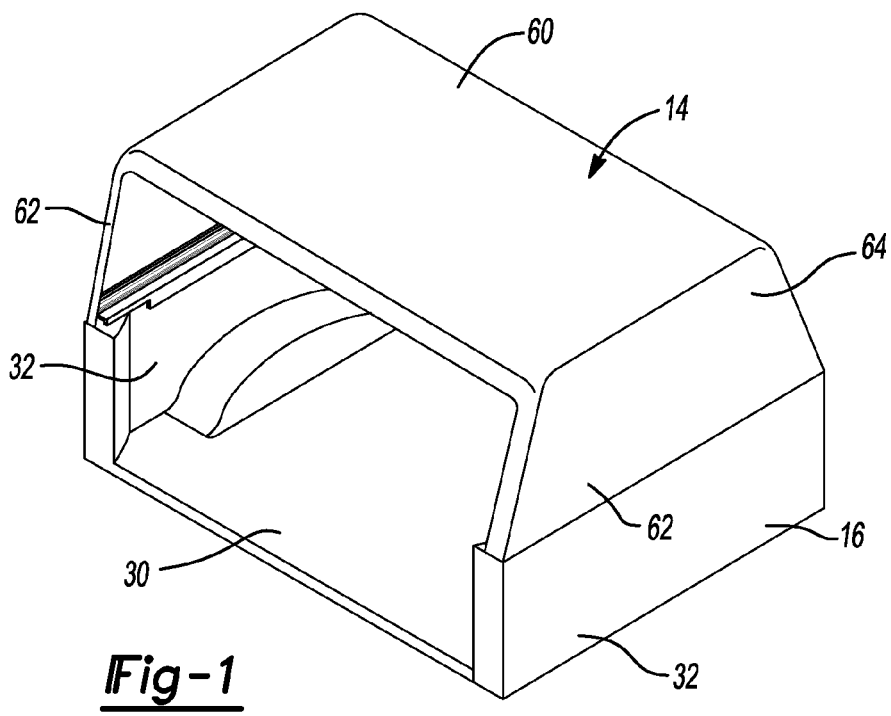
FIG. 1 is a partially transparent perspective view of a bi-fold popup soft tonneau cover according to an embodiment of the invention wherein the tonneau cover is in a closed configuration.

An embodiment of the invention is directed to a tonneau cover system for a storage bed on a utility terrain vehicle. While the concepts of the invention are particularly suited for this application, the tonneau cover system may be adapted for use in conjunction with other vehicles such as for covering the bed on a pickup or a bed on a utility trailer.

The tonneau cover system 10 may generally include a frame portion 12 and a cover portion 14 that are mounted with respect to a storage bed 16 on a utility vehicle, as illustrated in the figures. The storage bed 16 may take a variety of configurations and dimensions. In certain configurations, the storage bed 16 may be generally square or rectangular. The storage bed 16 may be formed from a single piece or may be formed from several sections that are joined together such as by welding.

The storage bed 16 may be defined by a base wall 30, a pair of side walls 32, a front wall 34 and a back wall (not shown). Dimensions of the respective walls may be selected based upon a variety of factors such as the size of the vehicle and the desired capacity of the storage bed 16.

The tonneau cover system 10 increases a volume of objects that may be stored in the storage bed 16 as compared to having a generally flat tonneau cover attached thereto while still extending a protective cover over the objects placed in the storage bed 16.

Figure 2:
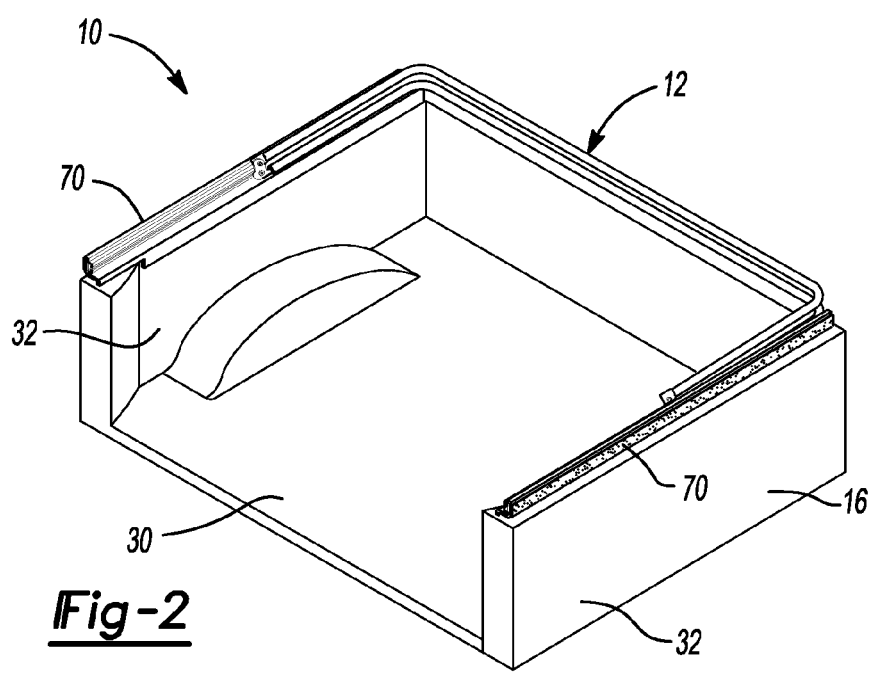
FIG. 2 is a perspective view of the tonneau cover in an open configuration.

The tonneau cover system 10 is movable between a closed configuration (FIG. 1) and an open configuration (FIG. 2). When in the closed configuration, the tonneau cover system 10 substantially covers the upwardly directed opening of the storage bed 16.

Figure 3:
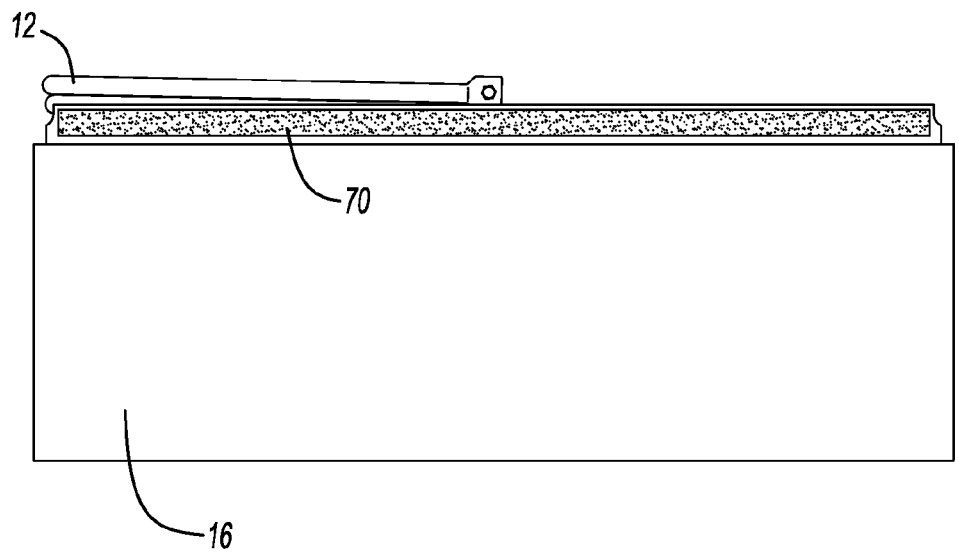
FIG. 3 is a side view of the tonneau cover in the open configuration.

When in the open configuration, a substantial portion of the storage bed 16 is not covered by the tonneau cover system 10 to facilitate placing objects into the storage bed 16 through the upwardly directed opening. When in the open configuration, the frame portion 12 may be substantially flat against an upper surface of the storage bed 16, as illustrated in FIGS. 2 and 3.

The frame portion 12 may include a first frame member 20 and a second frame member 22. In certain embodiments, the first frame member 20 and the second frame member 22 may have a substantially similar shape.

Figure 4:
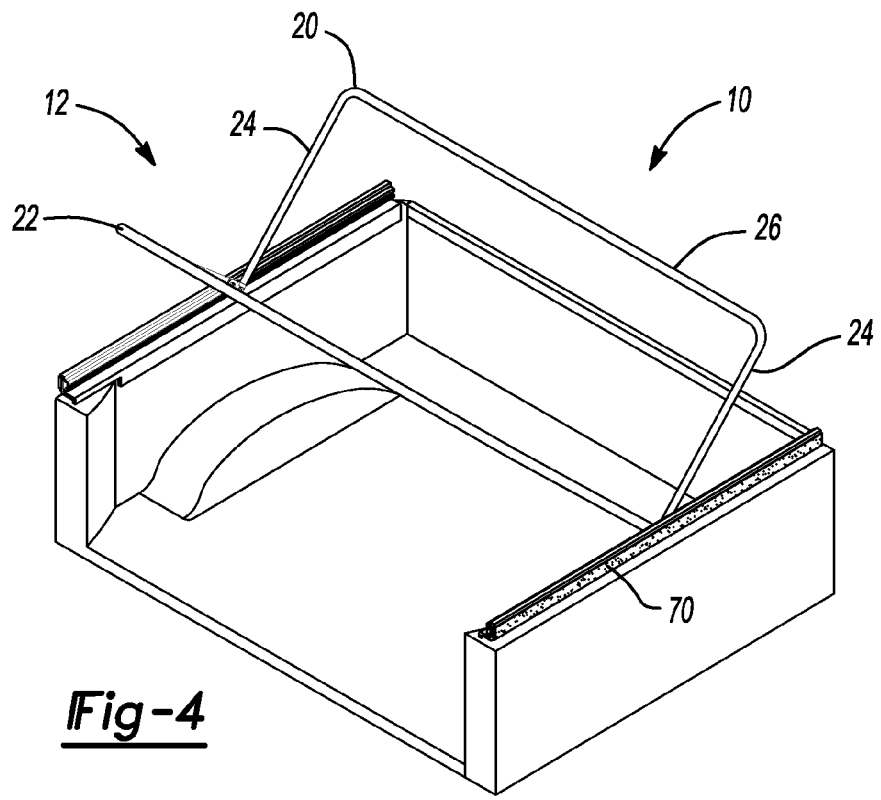
FIG. 4 is a perspective view of a frame for the tonneau cover wherein the frame is in a closed configuration.

The first frame member 20 and the second frame member 22 may each include a pair of side beams 24 and a center beam 26 that extends between the side beams 24, as illustrated in FIG. 4. This configuration provides the first frame member 20 and the second frame member 22 with a generally U-shape.

The side beams 24 may have a length that is approximately one-half of a length of the storage bed 16. The center beams 26 may have a length that is approximately the same as a width of the storage bed 16.

The first frame member 20 and the second frame member 22 may be formed from a variety of materials using the concepts of the invention. In certain embodiments, the first frame member 20 and the second frame member 22 are both formed from a substantially cylindrical tube having a diameter of between about ½ of an inch and about 2 inches.

A person of ordinary skill in the art will appreciate that the material from which the first frame member 20 and the second frame member 22 are formed plays a factor in determining the size of the tube. Other factors such as the length and width of the storage bed 16 and the intended use conditions may also play a role in determining the size of the tube.

The first frame member 20 and the second frame member 22 may be pivotally mounted with respect to the storage bed 16 to facilitate moving the frame portion 12 between the open configuration and the closed configuration, as illustrated in FIGS. 5-9. In certain embodiments, the first frame member 20 is pivotally mounted to the storage bed 16 and the second frame member 22 is pivotally mounted to the first frame member 20. A pivot axis of the first frame member 20 is thereby offset from a pivot axis of the second frame member 22.

Mounting the first frame member 20 and the second frame member 22 in this manner facilitates the first frame member 20 and the second frame member 22 being substantially flat against the storage bed 16 when in the open configuration, as illustrated in FIGS. 2 and 3.

Alternatively, the second frame member 22 may have a length and a width that are each slightly smaller than a length and a width of the first frame member 20. In this configuration, the first frame member 20 and the second frame member 22 may both pivot about the same axis.

The ends of at least one of the first frame member 20 and the second frame member 22 may be offset from the side 24 so that the first frame member 20 and the second frame member 22 may be generally parallel to each other when the tonneau cover system is in the open configuration.

Figure 5:
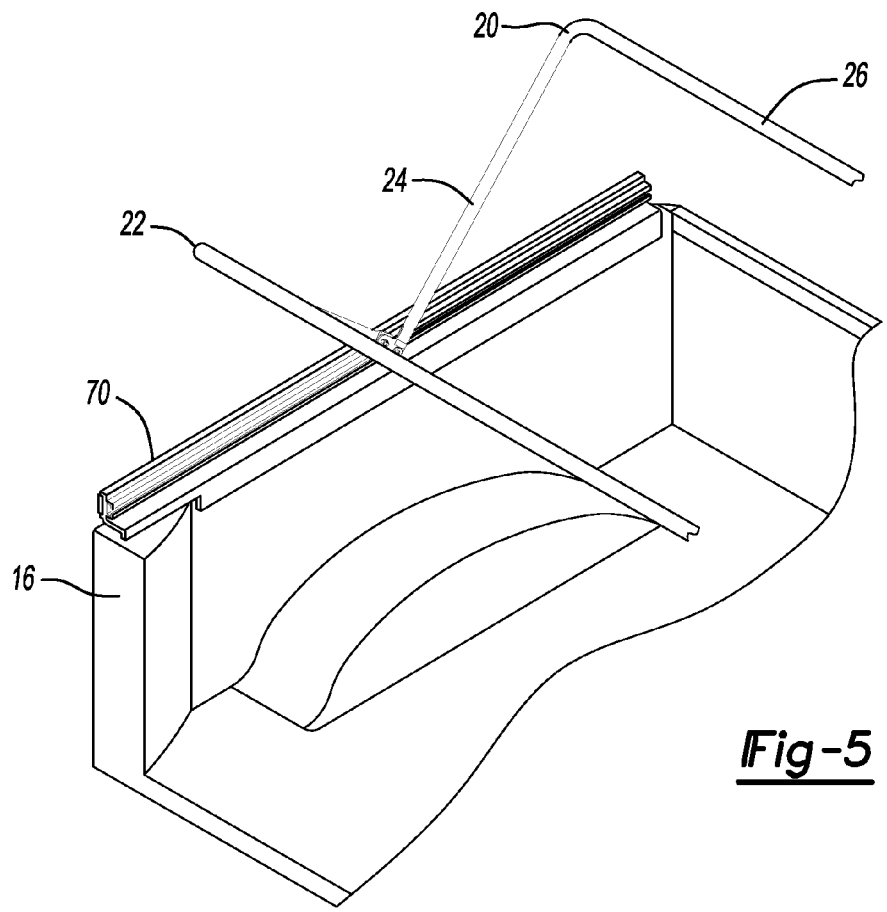
FIG. 5 is an inside perspective view of the frame in the closed configuration.
Figure 6:
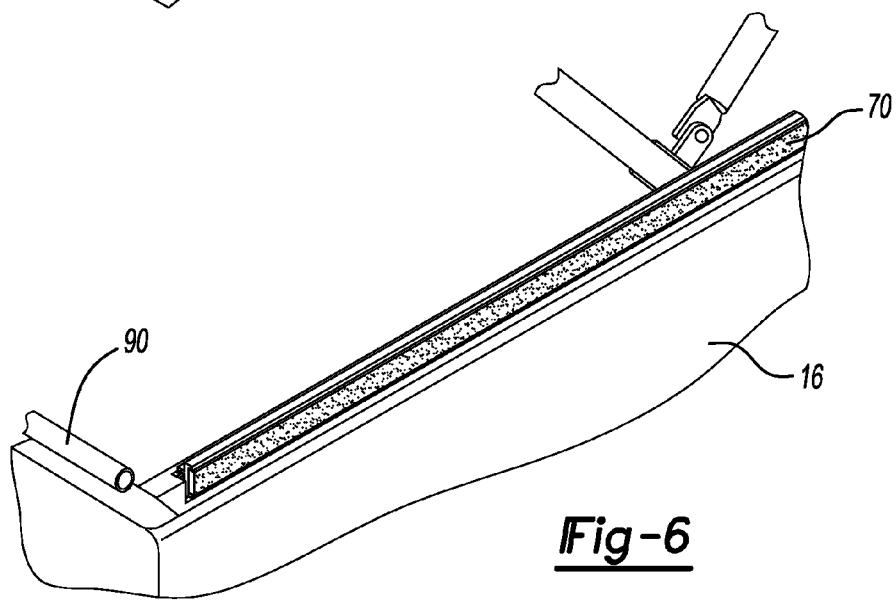
FIG. 6 is an outside perspective view of the frame in the closed configuration.
Figure 7:
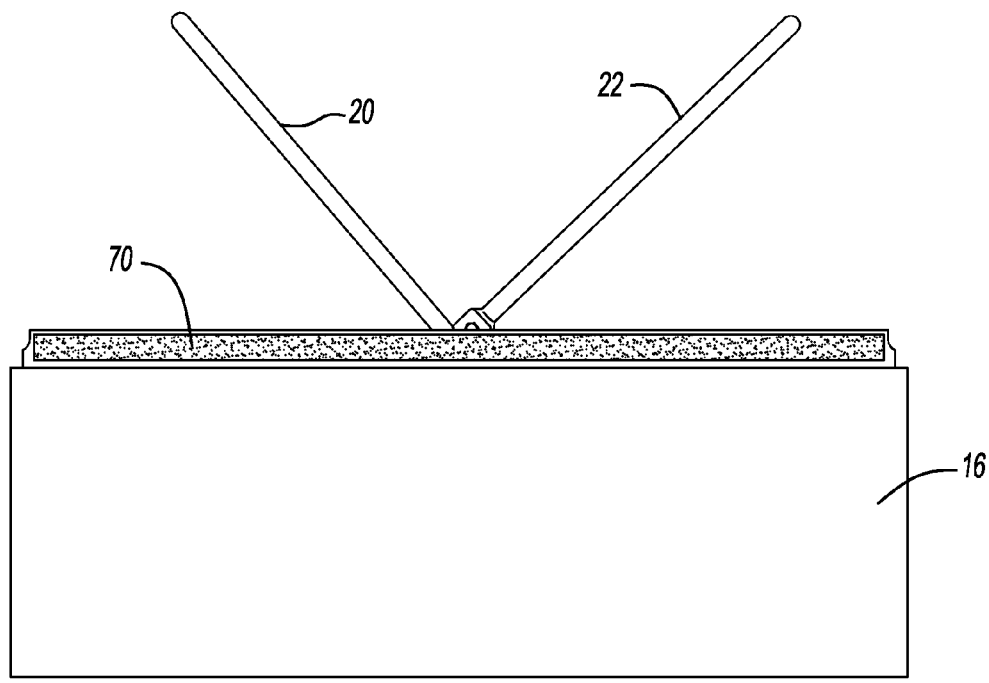
FIG. 7 is a side view of the frame in the closed configuration.
Figure 8:
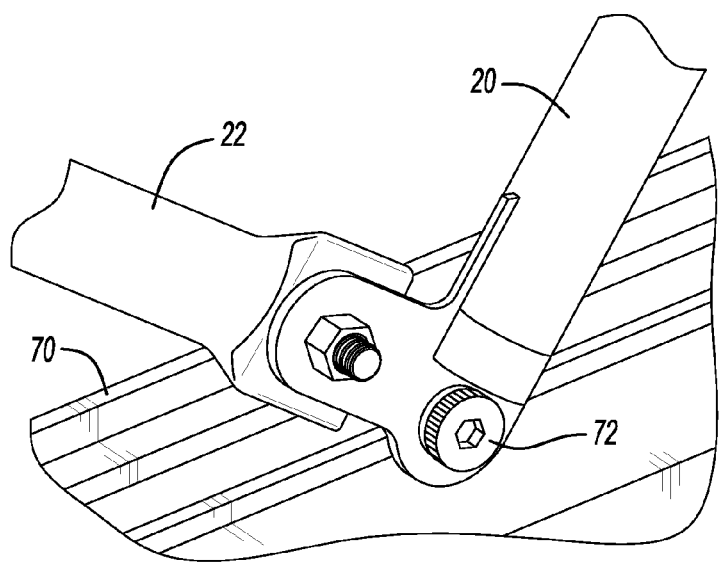
FIG. 8 is a perspective view of attachment of front and rear frame members of the frame in the closed configuration.

In certain embodiments, the pivot point at which the first frame member 20 and the second frame member 22 are mounted to the storage bed 16 may be stationary. In other embodiments, the pivot point may be movable such as using a mounting track 70, as illustrated in FIGS. 5-6.

Figure 9:
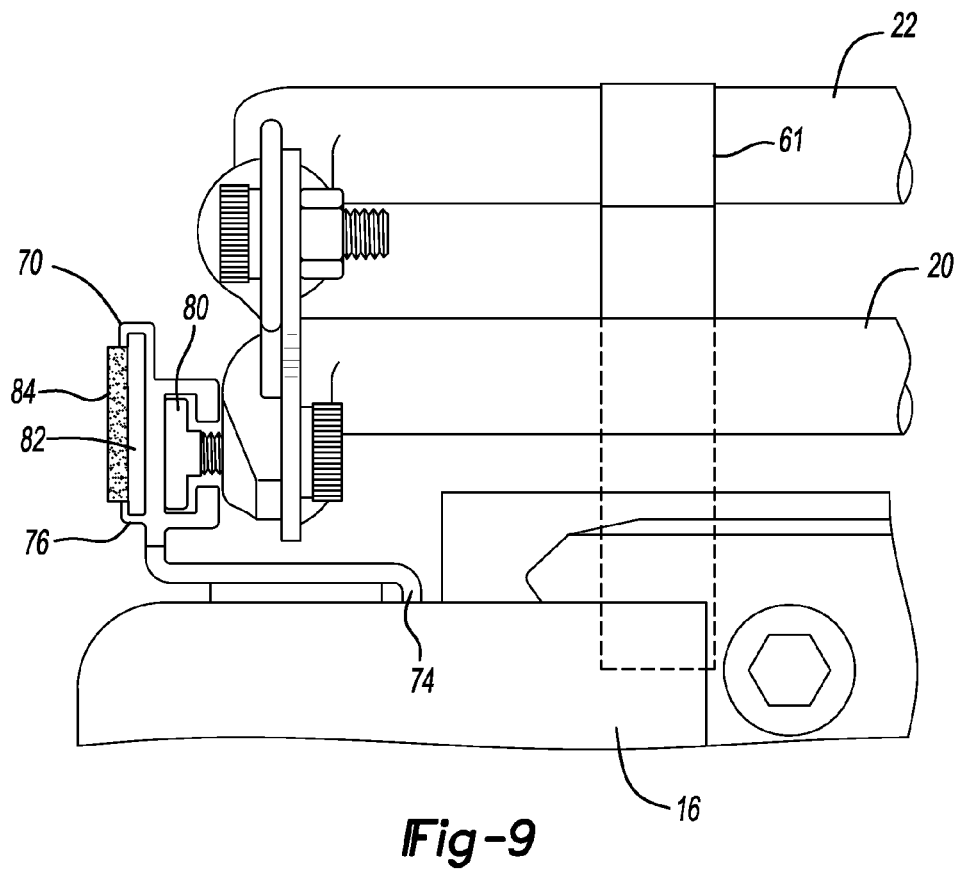
FIG. 9 is an end view of the frame in the closed configuration.

The mounting track 70 may include a lower track region 74 and an upper track region 76, as illustrated in FIG. 9. The lower track region 74 is utilized for attaching the mounting track 70 to storage bed 16. In one configuration, apertures are provided in the lower track region 74 and bolts are extended therethrough. In another configuration, at least one clamp (not shown) is provided to attach the mounting track 70 to the storage bed 16.

The upper track region 76 may be oriented in a generally horizontal configuration. The upper track region 76 may include a first channel 80 and a second channel 82. The first channel 80 may be mounted on a first side of the upper track region 76. The first channel 80 may be adapted to receive a portion of a hinge mechanism 72. Adjusting a location of the pivot point may be used to keep the cover portion 14 tight.

The second channel 82 may be mounted on a second side of the upper track region 76 that is opposite the first channel 80. The second channel 80 may be adapted to receive a releasable fastening mechanism 84 such as is used to attach the edges of the cover portion 14 to the storage bed 16. Examples of suitable devices that may be used for the releasable fastening mechanism 84 include hook and loop fasteners and snaps.

Alternatively, the sides of the tonneau cover system 10 may be formed with a length that overlays at least a portion of the mounting track 70. In such a configuration, the weight of the side regions 62 may maintain the side regions 62 in the closed configuration. While such a configuration may not be desirable for vehicles that move at high speeds, this configuration may be sufficient to provide protection to objects placed in the storage bed 16 for vehicles that only move at relatively speeds such as utility trailers.

The hinge mechanism 72 may be used to retain the first frame member 20 and the second frame member 22 at a specified position above the storage bed 16 when in the closed configuration. In certain embodiments, the first frame member 20 and the second frame member 22 are maintained at an angle of between about 30 and 60 degrees with respect to a surface of the storage bed 16.

A closure mechanism may also be provided to retain the frame portion 12 in the closed configuration. One suitable closure mechanism that may be used to retain the frame 12 in the closed configuration is a strap 61 (see FIG. 9) that extends from the second frame member 22 to a surface of the storage region 16 that is either along the back edge of the storage region 16 or is adjacent to the back edge of the storage region 16. The strap may be made from a variety of materials and such materials may have elastic characteristics.

The cover portion 14 may be fabricated with a shape that generally conforms to a shape of the frame portion 12 when in the closed configuration, as illustrated in FIG. 1. This configuration causes the cover portion 14 to have a top region 60, a pair of side regions 62, a front region 64 and a back region 66.

In certain embodiments, at least a portion of at least one of the side regions 62, the front region 64 and the back region 66 are not permanently attached to the adjoining region to facilitate lifting the unattached region to access the interior of the storage region 16. For example, the back region 66 may be permanently attached to the top region 60 and releasably attached to the side regions 62. Suitable mechanisms that may be used to releasably attach the back region 66 to the side regions 62 include hook and loop fasteners, snaps and zippers.

When the releasable attachment mechanism is released, the back region 66 may be rolled up from a lower surface thereof to provide access to the interior of the storage bed 16 without opening the entire tonneau cover system 10. A retaining mechanism may be provided to retain the back region 66 in the rolled up configuration. An example of one suitable retaining mechanism is a strap. The ends of the strap may be extended around the rolled up back region 66.

A fastening device may be provided to removably attach the adjoining regions that are not permanently attached to each other. Examples of suitable fastening devices include zippers, hook and loop fasteners and snaps.

In certain configurations, at least one of the side regions 62, the front region 64 and the back region 66 are removably attached to the adjoining regions to facilitate detaching such region.

The cover portion 14 may be fabricated from a variety of materials depending on the anticipated conditions in which the tonneau cover system 10 will be used. In certain embodiments, the cover portion 14 may be fabricated from vinyl. The cover portion 14 may be fabricated from material that is non-transparent, opaque, transparent or combinations thereof. It is also possible to fabricate the cover portion 14 from non-solid materials such as mesh.

A strap 92 may be attached to at least one of the frame portion 14 and the cover portion 16 to retain the tonneau cover system 10 in the open configuration and thereby reduce the potential of the tonneau cover system 10 inadvertently moving from the closed configuration as the vehicle to which the storage bed 16 is attached is moved.

A front fastener may be provided to retain the front region 64 in a stationary position with respect to a front side of the storage bed 16. The front fastener is particularly important when the vehicle on which the tonneau cover system 10 is anticipated to move at a high rate of speed with the tonneau cover system 10 in the closed configuration.

An example of one suitable front fastener is a front rail 90. The front rail 90 may be attached to the front side of the storage bed 16 using a variety of techniques. An example of one suitable attachment technique is screws.

While it is possible for the lower edge of the front region 64 to be permanently attached to the front rail 90, releasably attaching the lower edge of the front region 64 to the front rail 90 enables the front region 64 to be detached from the front rail 90. Examples of suitable fastening techniques include hook and loop fasteners, snaps and zippers.

Figure 10:
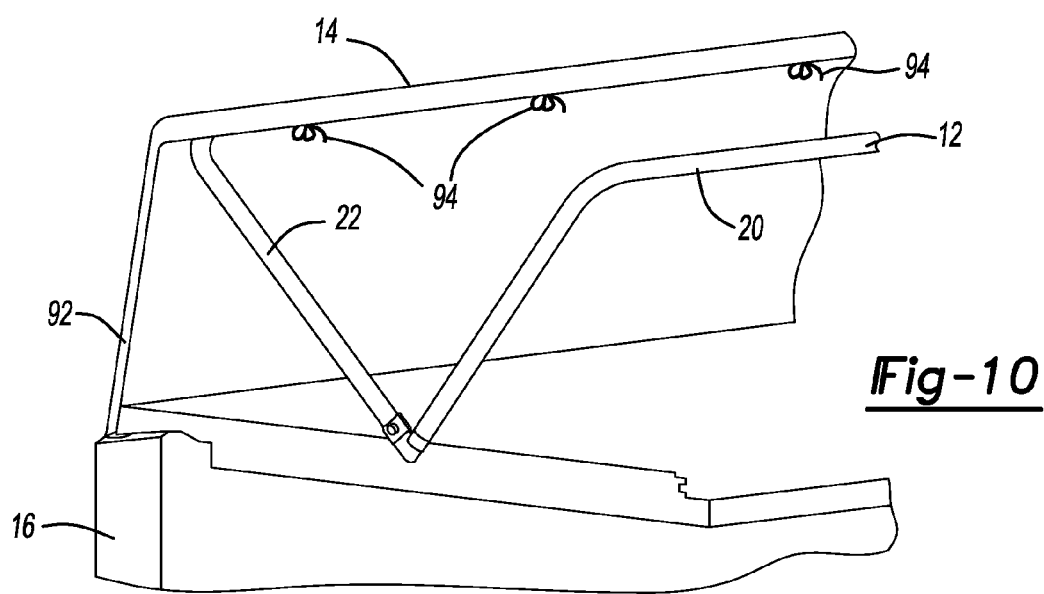
FIG. 10 is a partially broken away perspective view of the tonneau cover.

At least one cover tie 94 may be provided on an inner surface of the cover portion 14, as illustrated in FIG. 10. The cover tie 94 may extend around at least one of the first frame member 20 and the second frame member 22 to retain the cover portion 14 in a stationary position with respect to the first frame member 20 and the second frame member 22 to which the cover tie 94 is attached.

The cover tie 94 may releasable engage the first frame member 20 and/or the second frame member 22. An example of one suitable technique involves forming the cover tie 94 in two parts that are each attached to the cover portion 14. Free ends of the cover ties 94 engage each other such as with a knot. A releasable fastening device may also be used to retain the free ends of the cover ties 94 in engagement with each other. Examples of suitable releasable fastening devices include hook and look fasteners and snaps.

It is also possible for the cover tie to extend substantially across a width of the cover portion 14 such as being in the shape of a channel (not shown). The channel may be formed to receive one of the first frame member 20 and the second frame member 22. A fastening device such as a zipper may be provided to facilitate placing the first frame member 20 or the second frame member 22 in the channel.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A tonneau cover system for use in conjunction with a storage bed having an upwardly directed opening, wherein the tonneau cover system comprises:
   a frame portion comprising:
      a first mounting track;
      a second mounting track;
      a first frame member having a first end and a second end;
      a second frame member having a first end and a second end;
      a first hinge mechanism operably attaching the first ends of the first frame member and the second frame member to the first mounting track; and
      a second hinge mechanism operably attaching the second ends of the first frame member and the second frame member to the second mounting track; and
   a cover portion that extends over the frame portion,
   wherein the first mounting track and the second mounting track each comprises a first track region and a second track region, wherein the first track region attaches the respective mounting track to the storage bed on which the tonneau cover system is used, wherein the second track region comprises a first channel and a second channel, wherein the first channel is adapted to receive at least a portion of the first hinge mechanism or the second hinge mechanism.

2. The tonneau cover system of claim 1, wherein the first frame member and the second frame member each have a generally U-shape that is defined by a pair of side beams and a center beam that extends between the side beams.

3. The tonneau cover system of claim 1, wherein the first hinge mechanism is slidably mounted to the first mounting track and the second hinge mechanism is slidably mounted to the second mounting track.

4. The tonneau cover system of claim 1, wherein the second channel is adapted to receive a first releasable fastener.

5. The tonneau cover system of claim 4, wherein the cover portion includes a second releasable fastener proximate an edge thereof and wherein the second releasable fastener is capable of engaging the first releasable fastener.

6. The tonneau cover system of claim 1, wherein the cover portion comprises:
   a top region;
   a first side region extending from the top region;
   a second side region extending from the top region;
   a front region extending from the top region between the first side region and the second side region; and
   a back region extending from the top region between the first side region and the second side region.

7. The tonneau cover system of claim 6, wherein at least one of the front region and the back region are attached to at least one first side region and the second side region.

8. The tonneau cover system of claim 1, and further comprising a strap extending between the first frame member and the first mounting track to maintain the frame portion in a closed configuration.

9. The tonneau cover system of claim 1, and further comprising a front fastener, wherein the front fastener extends at least partially between the first mounting track and the second mounting track and wherein the cover portion comprises a fastening mechanism that is capable of engaging the front fastener.

10. A storage system comprising:
   a storage bed on a vehicle, wherein the storage bed has a first wall and a second wall and wherein the storage bed has an upwardly directed opening; and
   a tonneau cover system comprising:
      a frame portion comprising:
         a first mounting track;
         a second mounting track;
         a first frame member having a first end and a second end;

a second frame member having a first end and a second end;
a first hinge mechanism operably attaching the first ends of the first frame member and the second frame member to the first wall; and
a second hinge mechanism operably attaching the second ends of the first frame member and the second frame member to the side wall; and
a cover portion that extends over the frame portion,
wherein the first mounting track and the second mounting track each comprises a first track region and a second track region, wherein the first track region attaches the respective mounting track to said storage bed, wherein the second track region comprises a first channel and a second channel, wherein the first channel is adapted to receive at least a portion of the first hinge mechanism or the second hinge mechanism.

11. A method of covering a storage bed on a vehicle, wherein the method comprises:
providing a storage bed on a vehicle, wherein the storage bed has a base, a first wall and a second wall that define an upwardly directed opening;
providing a first frame member having a first end and a second end;
providing a second frame member having a first end and a second end;
attaching the first ends of the first frame member and the second frame member to the first wall with a first hinge mechanism;
attaching the second ends of the first frame member and the second frame member to the second wall with a second hinge mechanism;
placing a cover portion over at least a portion of the first frame member and the second frame member;
positioning the first frame member, the second frame member and the cover portion in a closed configuration where the cover portion substantially covers the upwardly directed opening;
moving the first frame member and the second frame member with respect to the first mounting track and the second mounting track to an open configuration where the first frame member, the second frame member and the cover portion do not cover a substantial portion of the upwardly directed opening;
attaching a first mounting track to the first wall, wherein the first hinge mechanism is slidably mounted with respect to the first mounting track;
attaching a second mounting track to the second wall, wherein the second hinge mechanism is slidably mounted with respect to the second mounting track,
wherein the first mounting track and the second mounting track each comprise a first track region and a second track region, wherein the first track region attaches the mounting track to the storage bed, wherein the second track region comprises a first channel and a second channel and wherein the first channel is adapted to receive at least a portion of the first hinge mechanism or the second hinge mechanism.

12. The method of claim 11, wherein the second channel is adapted to receive a first releasable fastener, wherein the cover portion includes a second releasable fastener proximate an edge thereof and wherein the second releasable fastener is capable of engaging the first releasable fastener.

13. The method of claim 11, wherein the cover portion comprises a top region, a first side region, a second side region, a front region and a back region, wherein the first side region extends from the top region, wherein the second side region extends from the top region, wherein the front region extends from the top region between the first side region and the second side region and wherein the back region extends from the top region between the first side region and the second side region.

14. The method of claim 13, and further comprising attaching at least one of the front region and the back region to at least one first side region and the second side region.

15. The method of claim 11, and further comprising extending a strap between the first frame member and the first mounting track to maintain the cover portion in the open configuration.

16. The method of claim 11, wherein the storage bed further comprises a front wall, wherein the method further comprises mounting a front fastening mechanism to the front wall, wherein the cover portion comprises a cover fastening mechanism that is capable of engaging the front fastening mechanism.

* * * * *